US006496613B2

(12) United States Patent
Okayama

(10) Patent No.: US 6,496,613 B2
(45) Date of Patent: Dec. 17, 2002

(54) WAVELENGTH ROUTER

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/821,047

(22) Filed: Mar. 30, 2001

(65) Prior Publication Data

US 2002/0025102 A1 Feb. 28, 2002

(30) Foreign Application Priority Data

Aug. 31, 2000 (JP) ........................................ 2000-263933

(51) Int. Cl.[7] .............................. G02B 6/42; G02B 6/26
(52) U.S. Cl. ............................. 385/18; 385/31; 385/32; 385/41; 385/42; 385/50
(58) Field of Search ............................. 385/18, 31, 32, 385/41, 42, 50, 15

(56) References Cited

U.S. PATENT DOCUMENTS 5,029,981 A * 7/1991 Thompson ................... 359/130
6,069,990 A * 5/2000 Okawa et al. ............... 359/115

OTHER PUBLICATIONS

"Optronics (2000) No. 2, pp. 139–143", Hiroshi Takahashi.
Hideaki Okayama, U.S. patent application Ser. No. 09/900,164, filed Jul. 9, 2001 (specification, claims, abstract and drawings).
Hideaki Okayama, U.S. patent application Ser. No. 09/847,398, filed May 3, 2001 (specification, claims abstract, drawings and declaration).

* cited by examiner

Primary Examiner—Robert H. Kim
Assistant Examiner—Richard Kim
(74) Attorney, Agent, or Firm—Wenderoth, Lind & Ponack, L.L.P.

(57) ABSTRACT

The wavelength router comprises two flat waveguides, and these flat waveguides are connected by connecting waveguides. In each flat waveguide, optical path converters are created at connecting sections with the connecting waveguides. The optical path converters convert the light propagation direction in the flat waveguide to the light propagation direction in the connecting waveguides, or perform inverted conversion of this conversion. By this configuration, a compact element with a high wavelength resolution can be implemented.

4 Claims, 3 Drawing Sheets

WAVELENGTH ROUTER

BACKGROUND OF THE INVENTION

1. Field of the Invention

The present invention relates to a wavelength router for setting a route of a wavelength-multiplexed light signal for each wavelength.

2. Description of Related Art

Of wavelength routers, various types have been known, including an array waveguide diffraction grating element, and an element using grating.

In document 1, "Optronics (2000), No. 2, pp. 139–143", an example of an array waveguide diffraction grating element is mentioned. Array waveguide diffraction grating elements have been the subject of vigorous research, since a plurality of input ports can be set and a single level operation is possible.

The array waveguide diffraction grating element has a configuration where two star coupler-shaped flat waveguides are connected with channel waveguides (connecting waveguides), which lengths are different from each other. The input/output ports are connected to ports on the side of the flat waveguide opposite to the connecting waveguides.

The wavelength dispersion characteristic is an index to measure the performance of an element. This indicates how much the direction of the optical beam changes with respect to the change of wavelength. The deflection direction of a beam is determined by the relationship of the optical path length difference between adjacent connecting waveguides and the width between the guides. As the optical path length difference increases and as the width d between the waveguides decreases, the deflection angle $d\Theta_r$ increases. The dispersion is given by the following formula (a).

$$\lambda d\Theta_r / d\lambda = -\Delta L / d \quad \ldots \text{(a)}$$

Here $\Delta L$ is an optical path length difference between the adjacent connecting waveguides. In the case of array waveguide diffraction grating, the cross-talk characteristic aggravates if optical coupling is generated between the connecting waveguides, so a 20 µm or more of space d is required between the connecting waveguides. Formula (b) shows the relationship of $\Delta L$ with the filter transmission area width $\Delta_F$.

$$\Delta L = 2\lambda^2 / (N\Delta\lambda_F) \quad \text{(b)}$$

Here N is the number of connecting waveguides. Therefore the following formula (c) is established.

$$d\Theta_r / d\lambda = -2\lambda / (Nd\Delta\lambda_F) \quad \text{(c)}$$

To have a good cross-talk characteristic, N must be 100 or more, so dispersion cannot be increased very much. But according to formula (c), dispersion can be increased by decreasing d.

For reference, the length L of the star coupler is calculated by the following formula (d).

$$L = (\Delta\lambda_F / \Delta\lambda_C)(NDd)/(2\lambda) \quad \text{(d)}$$

Here D is a space of the output ports and $\Delta\lambda_c$ is a wavelength difference between the wavelength channels. As the width d of the waveguides increases, the length L of the star coupler increases. For example, if $\Delta\lambda_F/\Delta\lambda_c = 1$, $d/\lambda = 20$, D=30 µm and N=100, then L=30 mm.

SUMMARY OF THE INVENTION

With the foregoing in view, it is an object of the present invention to provide a compact element with a high wavelength resolution by increasing dispersion by minimizing the space d between the connecting waveguides.

A wavelength router, according to the present invention, comprises two first waveguides, which have a plurality of input/output sections and a plurality of connecting sections, having a structure such that light entering from each of the input/output sections diffuses toward each of the connecting sections, a plurality of second waveguides, and optical path converters which guide light from the first waveguides to the second waveguide, or guide light from the second waveguides to the first waveguides, wherein each of the connecting sections of the two first waveguides are interconnected via the plurality of second waveguides, and the distances from the plurality of light input/output sections to each of the connecting sections are different from each other, and the optical path converters are disposed at the connecting sections.

According to this configuration, disposing the optical path converters decreases the width between the second waveguides compared with a conventional configuration. As a result, the wavelength dispersion characteristic improves. Therefore the length of the first waveguides can be decreased.

DESCRIPTION OF THE PREFERRED EMBODIMENT

An embodiment of the present invention will now be described with reference to the accompanying drawings. The drawings show the general shape, size and positional relationships merely to understand the present invention. Therefore the present invention is not restricted by the illustrated examples.

Figure 1:
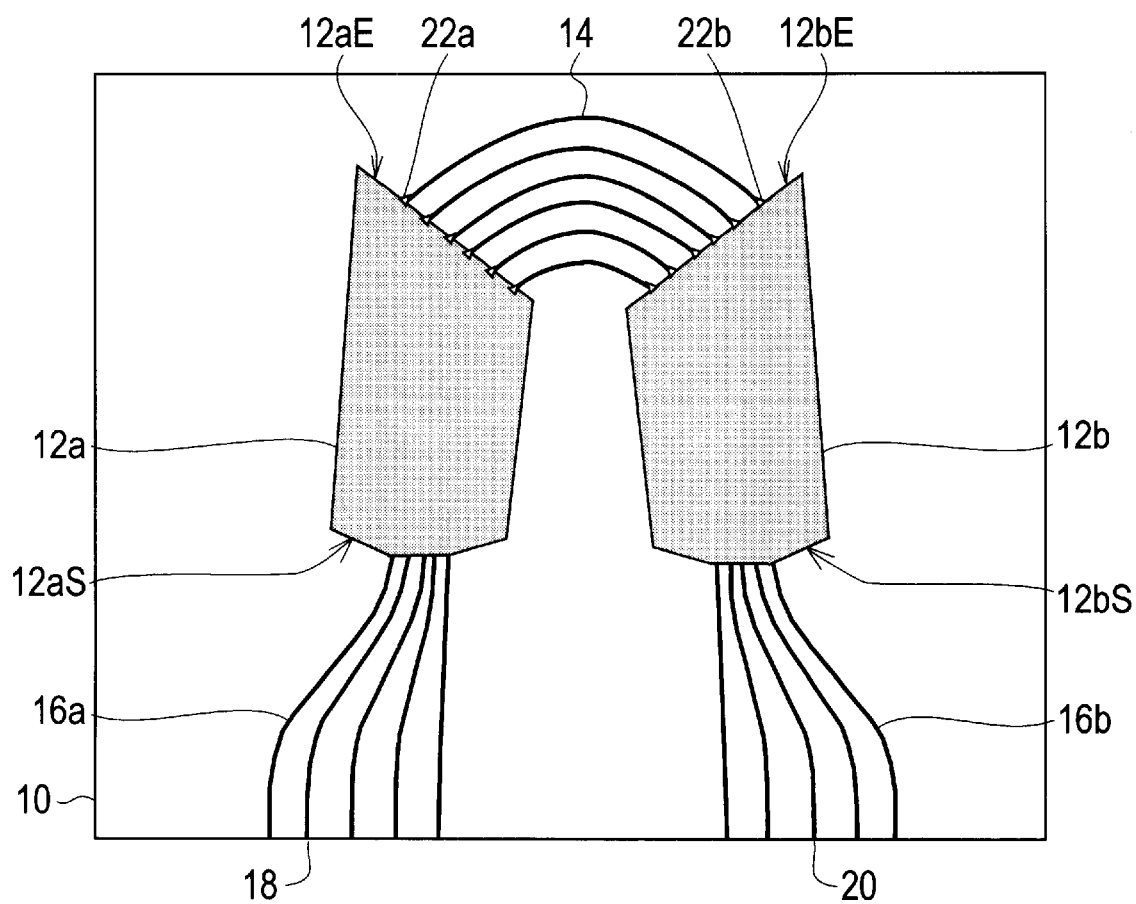
FIG. 1 is a diagram depicting the configuration of the wavelength router of an embodiment.

FIG. 1 is a plan view depicting the configuration of the wavelength router of the present embodiment. This wavelength router is comprised of optical waveguides created on a substrate 10. The substrate 10 is a substrate made of quartz, silicon, compound semiconductor, or organic matter, for example. The optical waveguide is created by embedding a core having a predetermined pattern in clad deposited on the substrate 10. The refractive index of the core is higher than the refractive index of the clad. In FIG. 1, the pattern of the core on the substrate 10 is shown by the black area, and the clad is not illustrated.

As the above-mentioned optical waveguides, this wavelength router has two flat waveguides 12a and 12b, a plurality of connecting waveguides 14, a plurality of channel waveguides 16a which are connected to one flat waveguide 12a, and a plurality of channel waveguides 16b which are connected to the other flat waveguide 12b. The number of the connecting waveguides and the channel waveguides are selected according to the wavelength multiplicity of the light signal to be input, for example.

The above-mentioned flat waveguide 12a has a connecting end face 12aE and an input/output end face 12aS, which face each other. In the same way, the other flat waveguide 12b also has a connecting end face 12bE and an input/output end face 12bS, which face each other. The connecting end face 12aE of one flat waveguide 12a and the connecting end face 12bE of the other flat waveguide 12b are connected by the array of the connecting waveguides 14. The length of each connecting waveguide 14 is different in this example, but may be the same.

Because of this configuration, the light signal output from the connecting end face 12aE of the flat waveguide 12a is guided to the connecting end face 12bE of the other flat waveguide 12b by the connecting waveguides 14.

The channel waveguides 16a are connected to the input/output end face 12aS of the flat waveguide 12a. In this example, the end parts of the channel waveguides 16a are used as input ports 18. In the same way, the channel waveguides 16b are connected to the input/output end face 12bS of the flat waveguide 12b. In this example, the end parts of the channel waveguides 16b are used as the output ports 20.

Therefore, the light signal which is input to one of the input ports 18 is guided to the input/output end face 12aS of the flat waveguide 12a by the channel waveguide 16a. The light signal which is output from the input/output end face 12bS of the flat waveguide 12b is guided to the output port 20 by the channel waveguide 16b.

In the flat waveguide 12a, the distance from the light input/output section (connecting section between the input/output end face 12aS and the channel waveguides 16a) of the input/output end face 12aS to the connecting section between the connecting end face 12aE, which faces the input/output end face 12aS, and each connecting waveguide 14, is different depending on the connecting waveguide 14. In the same way, in the flat waveguide 12b, the distance from the light input/output section (connecting section between the input/output end face 12bS and the channel waveguides 16b) of the input/output end face 12bS to the connecting section between the connecting end face 12bE, which faces the input/output end face 12bS, and each connecting waveguide 14, is different depending on the connecting waveguide 14.

Also, in the flat waveguide 12a, optical path converters (optical path converting sections) 22a are disposed at the connecting section between the connecting end face 12aE and the connecting waveguides 14. These optical path converters 22a convert the light propagation direction in the flat waveguide 12a to the light propagation direction in the connecting waveguides 14, or performs inverse conversion of this conversion. The configuration of the optical path converter 22a will now be described with reference to FIG. 2.

Figure 2:
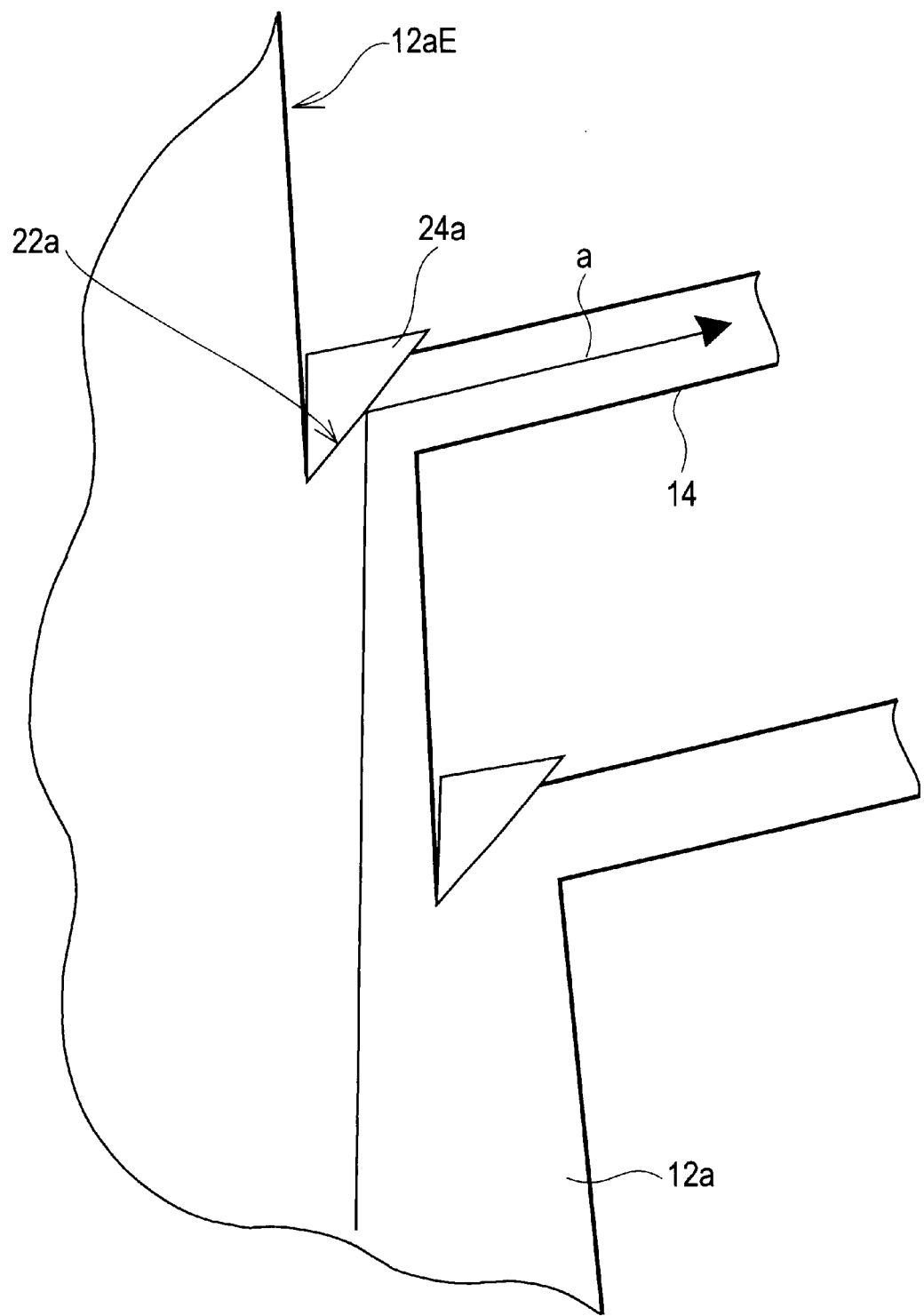
FIG. 2 is a diagram depicting the configuration of the area near the connecting end face of the flat waveguide.

FIG. 2 is a diagram showing an enlargement of the area near the connecting end face 12aE of the flat waveguide 12a. In this example, the side face of the above-mentioned connecting section of the core constituting the connecting waveguide 14 is the total reflection face, and this side face constitutes the optical path converter 22a. To make this side face to be the total reflection face, this side face is in a state where it does not contact the clad. This non-contact state is implemented by etching an opening 24a (triangular area in FIG. 2) into the clad by dry etching. Then, the side face of the core can be the total reflection face by the difference of the refractive index between the air in the opening 24a and the core.

If the connecting waveguide 14 is a ridge type, the side face of the core is not covered with clad, that is, the side face of the core is in a state where it does not contact the clad, so an opening need not be created.

In the same way, in the other flat waveguide 12b as well, optical path converters 22b are disposed at the connecting section between the connecting end face 12bE and the connecting waveguides 14. These optical path converters 22b convert the light propagation direction in the flat waveguide 12b to the light propagation direction in the connecting waveguides 14, or perform inverse conversion of this conversion. The configuration of the optical path converter 22b is the same as the configuration of the optical path converter 22a, which was described with reference to FIG. 2.

Therefore, as arrow a in FIG. 2 shows, the light signal which propagated in the flat waveguide 12a, reaching the connecting end face 12aE, is deflected by the optical path converters 22a, and is input to the connecting waveguides 14. The operation of the optical path converters 22a at this time corresponds to the above-mentioned "conversion". The light signal which reaches the connecting end face 12bE of the other flat waveguide 12b through the connecting waveguide 14 is deflected by the optical path converters 22b, and is input to the flat waveguide 12b. The operation of the optical path converters 22b at this time corresponds to the above-mentioned "inverse conversion".

Figure 3:
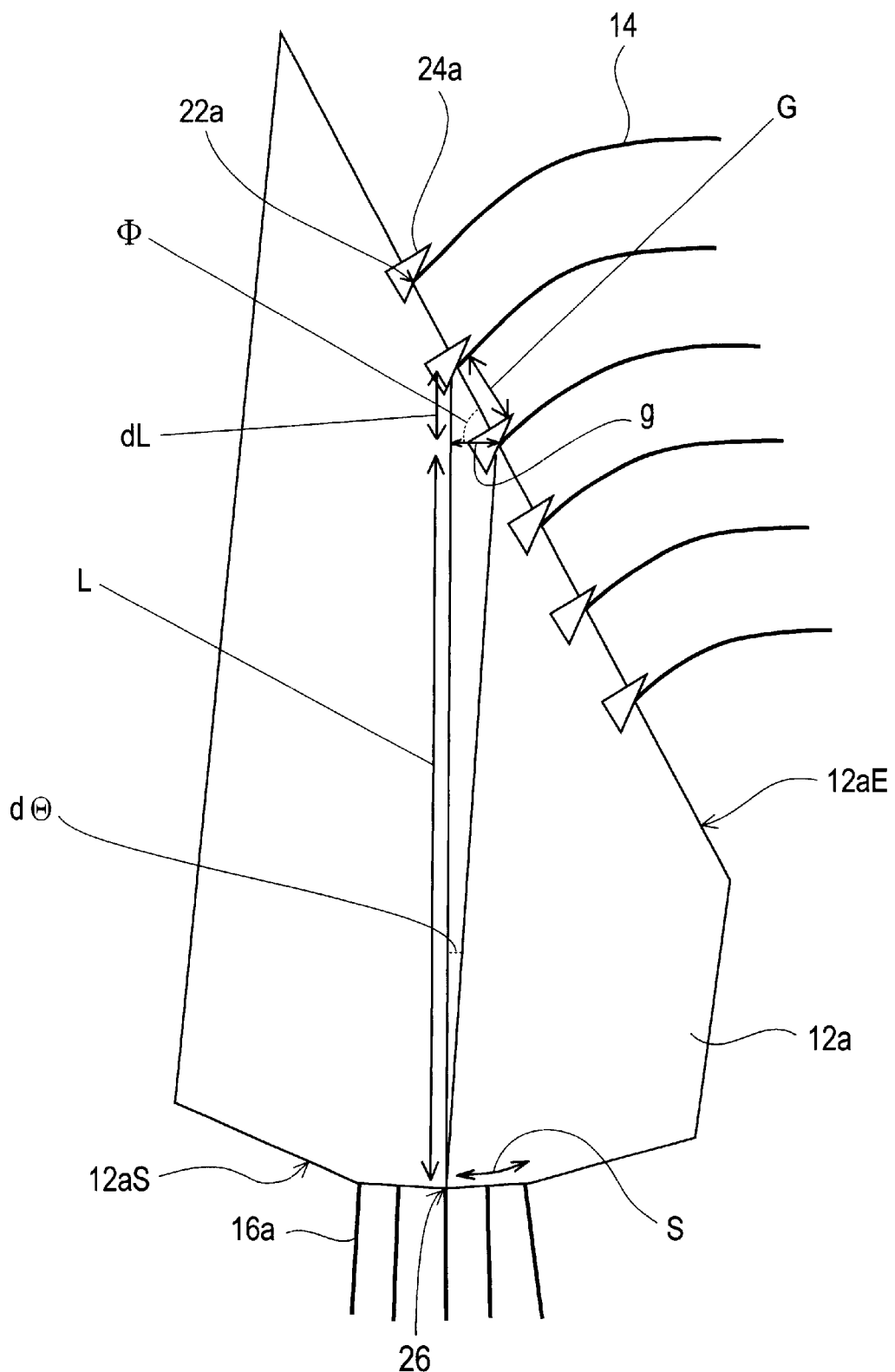
FIG. 3 is a diagram depicting the configuration of the flat waveguide.

FIG. 3 is a diagram showing an enlargement of the flat waveguide 12a. As FIG. 3 shows, the connecting end face 12aE of the flat waveguide 12a is inclined with respect to the light propagation axis, since the optical path converter 22a is created. Therefore, even if the space G between each connecting waveguide 14 is large, the actual space (space between the optical beams to be input to adjacent connecting waveguides respectively) g (=d) can be much smaller than G. This is the same for the flat waveguide 12b.

Now the operation of the wavelength router of the present embodiment will be described with reference to FIG. 1.

The light signal which is input to the input port 18 is guided to the input/output end face 12aS of the flat guide 12a by the channel waveguides 16a. In the flat waveguide 12a, where there is no lateral confinement, the lights propagate while spreading inside the flat waveguide 12a by diffraction. The lights which reach the connecting end face 12aE of the flat waveguide 12a are deflected by the optical path converters 22a, and are input to the connecting waveguides 14. The lights which reach the connecting end face 12bE of the flat waveguide 12b after propagating the connecting waveguides 14 are deflected by the optical path converters 22b, and are propagated inside the flat waveguide 12b toward the input/output end face 12bS. The lights from a plurality of connecting waveguides 14 interfere on the input/output end face 12bS and focus in the channel waveguides 16b.

The flat waveguide 12a in FIG. 3, for example, has a different distance between the diffraction position (condensing point) 26 on the input/output end face 12aS and each optical path converter 22a, and the connecting waveguides 14 have a different length. Therefore, the phase differs depending on which path the light takes. Also, this phase difference differs depending on the wavelength. As a consequence, the condensing position on the flat waveguide 12b changes depending on the wavelength, and a separation of light according to the wavelength becomes possible.

Now the wavelength dispersion characteristic of the wavelength router of this embodiment will be described with reference to FIG. 3.

First the optical path length difference in the flat waveguide 12a is determined. For this, the vertical angle of a triangle formed by an optical path converter 22a, an adjacent optical path converter 22a, and a condensing point 26 on the input/output end face 12aS is represented by $d\Theta$. The length of the side of the isosceles triangle included in this triangle (distance between one optical converter 22a and the condensing point 26) is represented by L. The angle formed by the side connecting both the optical path converters 22a and the base of the above-mentioned isosceles triangle is represented by $\Phi$. The difference of the distance between one optical path converter 22a and the condensing point 26 and the distance between the other optical path converter 22a and the condensing point 26 is represented by dL.

To obtain a good cross-talk characteristic, the angle $d\Theta$ must be constant for any set of optical path converters 22a. The above-mentioned L represents an optical path length of an optical path in the flat waveguide 12a, and dL represents the optical path length difference between optical paths in the flat waveguide 12a.

The following formulas (1) and (2) are established.

$$\tan(d\Theta/2)=[G/(2L)] \cos \Phi/\{1+[G/(2L)]\sin \Phi\} \quad (1)$$

$$dL=G \sin \Phi/\cos(d\Theta/2) \quad (2)$$

The change $\delta(dL)$ of the optical path length L, due to the positional shift S of the diffraction position or the condensing point 26, is $\Phi(=S/L)$, so the relationship given by the following formula (3) is derived from the formula (2).

$$\delta(dL)=[G \cos\Phi/\cos(d\Theta/2)] S/L \quad (3)$$

Also the relationship given by the following formula (4) is derived from the formula (1).

$$G/L=2 \tan(d\Theta/2)/\{\cos \Phi[1-2 \tan(d\Theta/2)\tan \Phi]\} \quad (4)$$

Therefore, $\delta(dL)$ is derived from the formulas (3) and (4), and the following formula (5) is obtained.

$$\delta(dL)=2 \tan(d\Theta/2) S/\{\cos (d\Theta/2)[1-2 \tan(d\Theta/2)\tan \Phi]\} \quad (5)$$

If A is defined by the following formula (6), then $\delta(dL)$ is represented by AS.

$$A=2 \tan(d\Theta/2)\{\cos (d\Theta/2)[1-2 \tan(d\Theta/2)\tan \Phi]\} \quad (6)$$

If the angle $d\Theta$ is sufficiently small, then $A \sim d\Theta$ (that is, A is approximately equal to $d\Theta$). Since the formula (5) does not depend on L, the change of the optical path becomes the same for all paths by adjusting $d\Theta$ and $\Phi$, and phase chirping, which aggravates characteristics, is not generated. When the total optical path length difference between optical paths is $\Delta L$, the phase term is given by ik ($\Delta L$ +AS), where i is a path number. Here k is a wave number of light. If m is a degree of interference, then the lights focus at a position of k ($\Delta L$ +AS)/2=m$\pi$. Therefore, the wavelength $\lambda$, for the lights to focus, is given by $\lambda=(\Delta L + AS)/m$. Consequently, the dispersion $dS/d\lambda$ is given by the following formula (7).

$$dS/d\lambda=m/A\sim/\Delta L(\lambda d\Theta) \quad (7)$$

In other words, the dispersion $dS/d\lambda$ is approximately equal to $\Delta L/(\lambda d\Theta)$. If the deflection angle $d\Theta_r$ is represented by $d\Theta_r=dS/L_{av}$ using the formula (7), the wavelength dispersion is determined by the following formula (8) using the relationship $L_{av}d\Theta=g_{av}$.

$$\lambda d\Theta_r/d\lambda=-\Delta L/g_{av} \quad (8)$$

Here, $L_{av}$ is an average value of L and $g_{av}$ is an average value of g. As mentioned above, conventional d=G became d=g=G cos $\Phi$, and actual space g, between each connecting waveguide 14, became smaller than G. Therefore, the wavelength dispersion characteristic improved, about 1/cos $\Phi$. In other words, if the characteristic is the same, then the length of the flat waveguide is decreased by cos $\Phi$. For example, if $\Phi$ is 75 degrees, then the wavelength dispersion characteristic improves about four times.

A specific calculation example when $\Phi$ is 75 degrees will be shown below.

As described above, the relationship of the following formula (9) is established.

$$d\Theta_r/d\lambda=-2\lambda/(Nd\Delta\lambda_F) \quad (9)$$

Here, $\Delta\lambda_F$ is a filter transmission area width. N is a number of connecting waveguides, and d is a space between connecting waveguides.

The length $L_{av}$ of the flat waveguide is calculated by the following formula (10).

$$L_{av}=(\Delta\lambda_F/\Delta\lambda_c)(NDd)/(2\lambda) \quad (10)$$

Here, $\Delta\lambda_c$ is a wavelength difference between the wavelength channels, and D is a space of channel waveguides on the input/output end face of the flat waveguide.

In formula (9), $\lambda/d=0.05$, N=100, $\Delta\lambda_F=0.0001$, and d is a multiple of cos $\Phi$, therefore the conventional $d\Theta_r/d\lambda=-10$ becomes $d\Theta_r/d\lambda=-40$ in the wavelength router of the present embodiment. In other words, $d\Theta_r=0.4$ rad (22 degrees) is implemented when the wavelength difference is $d\lambda=0.01$.

In the formula (10), $\Delta\lambda_F/\Delta\lambda_c=1$, $d/\lambda=20$, D=30 $\mu$m, N=100, and d is a multiple of cost, therefore, the conventional La, =30 mm becomes $L_{av}=8$ mm in the wavelength router of the present embodiment.

If the space between channel waveguides is decreased at the input/output section as well, the flat waveguide length can be further decreased. If D=10 $\mu$m, for example, the $L_{av}$ can be further improved 3 times, and becomes about $L_{av}=3$ mm.

As described above, according to the wavelength router of this embodiment, the width between the connecting waveguides 14 can be smaller than a conventional configuration by creating the optical path converters 22a and 22b. Therefore the wavelength dispersion characteristic improves. As a consequence, the length of the flat waveguide can be decreased.

Conventionally a tapered structure must be created at the section connecting with the connecting end face of the connecting waveguide to pick-up the light diffused inside the flat waveguide which leaks into the area between connecting waveguides (e.g. see document 1). In the case of the wavelength router of the present embodiment, where optical path converters are equipped, the tapered structured is unnecessary. Therefore, according to the wavelength router of this embodiment, when light enters from the connecting waveguides 14 to the flat waveguide 12b, the diffraction angle of light, which is in inverse proportion to the width of the connecting section of the connecting waveguides 14, can be increased. As a result, the diffracted light can be spread throughout the input/output end face 12bS, even if the length of the flat waveguide 12b is not very long, and uniformity of the power of the output light can be implemented by a relatively short flat waveguide.

In the present embodiment, the wavelength router has a symmetric configuration with respect to the connecting waveguides, as FIG. 1 shows, but is not restricted by this configuration. Also in the present embodiment, each connecting waveguide is curved, as FIG. 1 shows, but each connecting waveguide may also be straight by changing the direction of the optical path converter. A principle of reflection is used for the optical converter, but a principle of refraction may also be used. For example, the flat waveguide 12a and the connecting waveguide 14, which are made of materials with a different refractive index, are connected at the diagonal boundary surface.

What is claimed is:

1. A wavelength router comprising:

two first waveguides, each having a plurality of input/output sections, a plurality of connecting sections, and a structure such that light entering from each of said input/output sections diffuses toward each of said connecting sections;

a plurality of second waveguides; and optical path converters which guide light from said first waveguides to said second waveguides, or guide light from said second waveguides to said first waveguides;

wherein:

said connecting sections of one of said two first waveguides are interconnected to said connecting sections of the other of said two first waveguides, respectively, via said plurality of second waveguides, respectively;

distances between said plurality of light input/output sections and said connecting sections of each first waveguide are different from each other;

said optical path converters are disposed at said connecting sections;

a length of a line connecting two adjacent optical path converters on each first waveguide is G.;

a first optical path length between a first of the two adjacent optical path converters and a condensing point at one of said input/output sections is L;

a second optical path length between a second of the two adjacent optical path converters and the condensing point is L plus dL;

the two adjacent optical path converters are located such that an isosceles triangle is formed having: as one side the first optical path length; as another side a portion from the condensing point to a length L along the second optical path length; and a base of length g;

an angle Φ between the base of length g of the isosceles triangle and the line of length G connecting the two adjacent optical path converters is 75 to 90 degrees; and g equals G cos Φ.

2. A wavelength router according to claim 1, further comprising:

a substrate; and a clad deposited on said substrate, wherein said two first waveguides and said plurality of second waveguides are created by embedding a core with a predetermined pattern into said clad, and said optical path converters are total reflection surfaces.

3. A wavelength router according to claim 2, further comprising openings created in said clad, wherein said total reflection surfaces are boundary faces between said openings and said clad.

4. A wavelength router according to claim 1, wherein an angle between the first and second optical path lengths is $d\Theta$;

a change in optical path length L due to a positional shift S of the condensing point is:

$$\delta(dL) = 2\tan(d\Theta/2)S/(\cos(d\Theta/2)(1-2\tan(d\Theta/2)\tan\Phi)).$$

* * * * *